(12) United States Patent
Brooks (10) Patent No.: US 12,467,420 B1
(45) Date of Patent: Nov. 11, 2025

(54) AC/DC ECO ELECTRIC TURBO ASSEMBLY

(71) Applicant: Eddie Lee Brooks, McComb, MS (US)

(72) Inventor: Eddie Lee Brooks, McComb, MS (US)

(73) Assignee: Rise Holdings, LLC, Ridgeland, MS (US)

( * ) Notice: Subject to any disclaimer, the term of this patent is extended or adjusted under 35 U.S.C. 154(b) by 0 days.

(21) Appl. No.: 18/599,873

(22) Filed: Mar. 8, 2024

(51) Int. Cl.
  *F02K 3/06* (2006.01)
  *F02C 6/12* (2006.01)
  *F02C 7/36* (2006.01)

(52) U.S. Cl.
  CPC .............. *F02K 3/06* (2013.01); *F02C 6/12* (2013.01); *F02C 7/36* (2013.01)

(58) Field of Classification Search
  CPC ...... F02K 3/06; F02C 6/12; F02C 7/36; F01D 5/10; F05D 2220/34; F05D 2220/764; F05D 2220/762; F03D 9/32; F04D 25/0606
  See application file for complete search history.

(56) References Cited

U.S. PATENT DOCUMENTS

| | | | | |
|---|---|---|---|---|
| 4,563,622 A | * | 1/1986 | Deavers | H02P 6/14 318/400.26 |
| 6,373,145 B1 | * | 4/2002 | Hamrick | F03D 9/25 290/55 |
| 11,878,812 B2 | * | 1/2024 | Schenk | H02K 1/2783 |
| 2008/0054739 A1 | * | 3/2008 | Lueck | F02C 7/32 310/58 |
| 2009/0121073 A1 | * | 5/2009 | Doane | B64D 27/33 244/129.4 |
| 2012/0112461 A1 | * | 5/2012 | Saluccio | F03D 9/11 290/55 |
| 2017/0369179 A1 | * | 12/2017 | Bradbrook | F02C 7/18 |
| 2022/0363378 A1 | * | 11/2022 | Schlak | B64D 27/34 |

* cited by examiner

*Primary Examiner* — Nathaniel E Wiehe
*Assistant Examiner* — Joshua R Beebe (57) ABSTRACT

An electric turbine assembly and method of using the assembly is disclosed to convert kinetic energy from airflow or the flow of another fluid resulting from the motion of a prime mover, such as a jet airplane, into usable potential energy and/or thrust. This invention may be used not only as an attachment to aircraft, but also for any vehicle, train, vessel, or other prime mover. This abstract is non-limiting.

14 Claims, 8 Drawing Sheets

AC/DC ECO ELECTRIC TURBO ASSEMBLY

CROSS-REFERENCE TO RELATED APPLICATIONS

The benefit of the 8 Mar. 2023 filing date of U.S. provisional patent application Ser. No. 63/488,989 is claimed under 35 U.S.C. § 119(e) in the United States and is claimed under applicable treaties and conventions in all countries. The complete disclosure of the priority application is hereby incorporated by reference in its entirety.

STATEMENT OF GOVERNMENT RIGHTS

Not applicable.

TECHNICAL FIELD

This invention relates generally to the field of propulsion systems, and in exemplary though non-limiting embodiments, to novel rotating turbo fan assemblies that improve the efficiency of aircraft, vessels, trains, and other prime movers.

BACKGROUND OF THE INVENTION

Jet engines perform by converting fuel into thrust. The thermal efficiency and propulsive efficiency of jet engines, in combination, determine how much waste a jet engine produces. Thermal efficiency refers to the heat loss or waste heat produced by the engine. Propulsive efficiency refers to the waste kinetic energy in the wake of the jet engine.

Although there have been advancements in efficiency for jet engines, shortcomings remain. There remains room for improvement of the propulsive efficiency of jet engines; prior efforts to overcome inefficiency in jet engines have largely focused on thermal efficiency. There is a lack of innovation regarding harnessing the waste kinetic energy.

Specifically, there is a lack of solutions available for harnessing the waste kinetic energy in the wake of a jet engine. More broadly, for prime movers of moving vehicles including but not limited to planes, trains, land vehicles, and waterborne vessels, there is a lack of solutions available for harnessing the kinetic energy of bypassing air or other fluids that is created due to the motion of the prime mover. There is a need for devices and methods that aim to harness the kinetic energy of fluids in motion that comprise waste kinetic energy and/or unused kinetic energy from bypass fluids associated with the motion of prime movers.

BRIEF SUMMARY OF THE INVENTION

I have discovered a novel assembly comprising an ultra-high-volume turbine system designed for maximum air intake in conjunction with a field coil and armature rotor and optionally, in some embodiments, one or more conversion chambers that, when applied to a prime mover, harnesses the kinetic energy of air or other fluids bypassing the prime mover or, as the case may be, in the wake of a prime mover. This novel design allows for a maximized intake volume of air or fluids that is then compressed through a series of turbines powered by an electrical rotor drum/armature and field coil(s) and/or other coil type(s) resulting in a high-pressure fluid exiting the exhaust ports. In some embodiments, the exhausted bypass fluid exiting the exhaust ports of the latter turbine sections enters one or more conversion chambers, whereby the kinetic energy of said exhausted bypass fluid can further be harnessed as thrust, electrical energy, or potential energy depending on the configuration of the conversion chamber and whether fuel is applied.

Uses for the novel assembly include not only attachment laterally proximate to a jet engine, as shown herein in the drawings, but also attachment to the exhaust outlet of a jet engine, attachment to the intake of a jet engine, and attachment to any prime mover whereby bypass fluid can enter the assembly. These uses are exemplary and nonlimiting.

Elements and steps in the figures are illustrated for simplicity and clarity and have not necessarily been rendered according to a particular sequence. For example, steps that may be performed concurrently or in a different order are illustrated in the figures to help improve understanding of various possible embodiments of the present disclosure.

DETAILED DESCRIPTION OF THE INVENTION

Illustrative embodiments of the preferred embodiment are described below. Not all features of an actual implementation are described in this specification; in the development of any such actual embodiment, numerous implementation-specific decisions must be made to achieve the developer's specific goals. While these exemplary embodiments are described in sufficient detail to enable persons skilled in the art to practice the disclosure, it should be understood that other embodiments may be realized and adaptations in design and construction may be made in accordance with this disclosure and the teachings herein. Thus, the description herein of specific embodiments is not intended to limit the application to the particular embodiments disclosed, but on the contrary, the intention is to cover all modifications, equivalents, and alternatives falling within the spirit and scope of the present application as defined by the appended claims.

The AC/DC Eco Electric Turbine Assembly, as disclosed herein, applies bypass air, jet wakes, or other fast-moving fluids (collectively herein "bypass fluids") to a high-intake-volume and high-pressure turbine assembly that, coupled with a field coil and armature rotor, allows the generation of AC or DC current.

Figure 1:
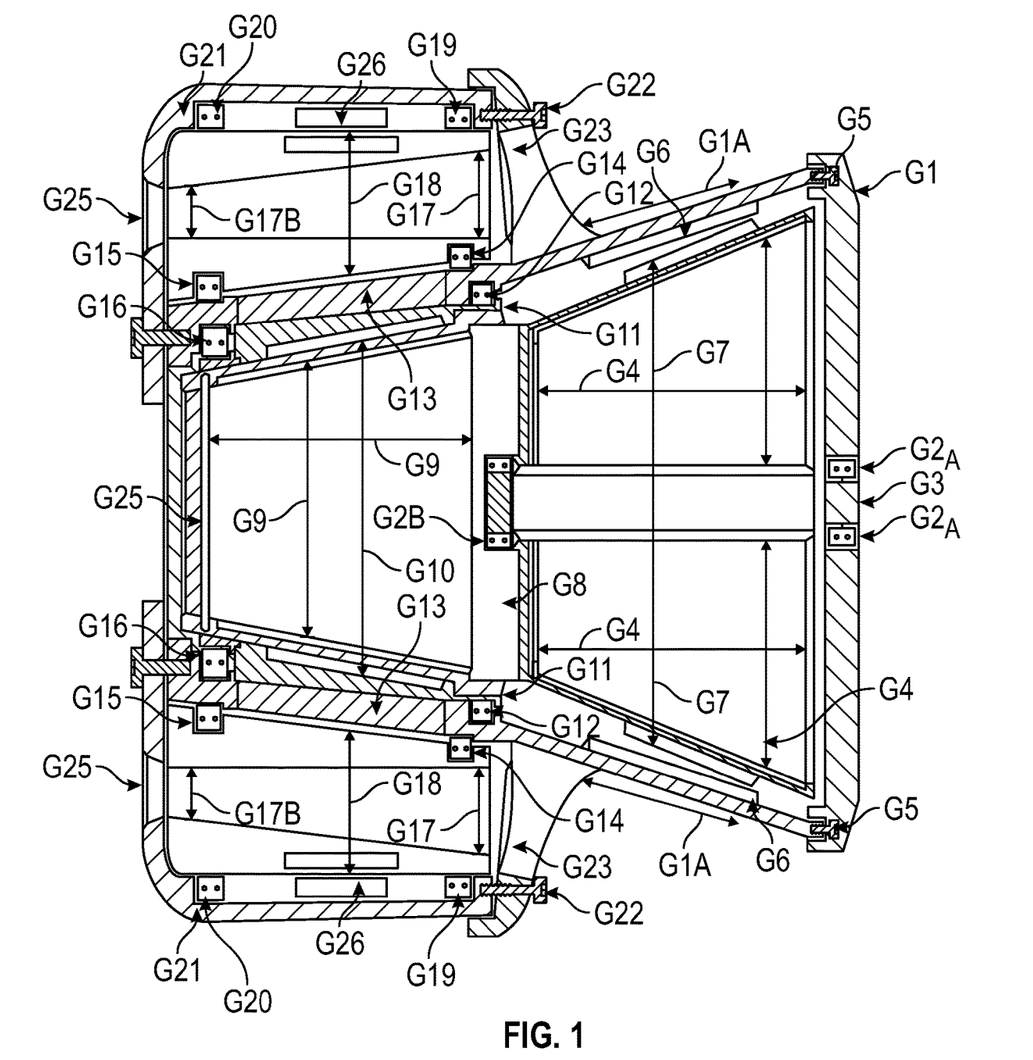
FIG. 1 is a section view of an AC/DC Eco Electric Turbo Assembly according to an embodiment of the present application.

FIG. 1 shows the AC/DC Eco Electric Turbo Assembly according to an embodiment of the present application. In the assembly of FIG. 1, a turbo propulsion system is shown that utilizes three stages, or "pneumatic sections" in the compression of bypass fluid resulting from the motion of a prime mover. The first pneumatic section has a primary housing, G1A, which is a conically shaped cylindrical tube providing exterior attachments for the intake bearing support G1 to be rigidly mounted to the primary housing by dial pins and/or bolt fasteners G5. An intermediate shaft G3 is joined on the intake end by an intake rotor drum bearing G2A and on the output end by an output rotor drum bearing G2B to an intake rotor drum armature G7. The intermediate shaft G3 may be made of heat-treated aluminum, manganese, or magnesium. Turbine fan blades G4 (not shown) made of stainless steel, titanium, or carbon fiber are installed in the intake rotor drum/armature G7. The turbine fan blades G4 pull air inward when being rotated by the first pneumatic section's intake rotor drum armature G7. An intake field coil G6 is fixed to the inner edge of the primary housing G1A. Within the primary housing G1A, there is imbedded an output field coil G13.

In the assembly of FIG. 1, the second pneumatic section has an outer rotor frame G11, which is secured to the first pneumatic section's primary housing G1A by an inner output bearing/snap ring G12 and an exhaust rotor drum bearing G16. These two bearings G12 and G16 act to stabilize and align the outer rotor frame G11 and inner rotor drum G9. The inner rotor drum G9 have blade locating guides along the interior, and the second pneumatic section's armature G10 is embedded in the inner rotor drum G9 extending slightly beyond the outer surface of the rotor drum G9. An intermediate shaft support G8 is attached to the intake rotor drum armature by an output rotor drum bearing G2B, which bearing G2B is inserted into a machined bearing bore located at the center of the outer rotor frame G11.

In the assembly of FIG. 1, the third pneumatic section has a rotor and bearings housing G21. An exhaust bearing and snap ring G20 is installed in the inner face of the output end of the housing G21, and the drum rotor G18 is attached to the rotor and bearings housing G20 by the distal rotor exhaust bearing G20, distal rotor exhaust bearing G19, proximal intake rotor drum bearing G14 and proximal exhaust rotor drum bearing G15. The drum rotor G18 has an imbedded field coil and armature rotor G26. Bypass fluid can enter the third pneumatic section from the intake port G17 and exit the third pneumatic section by the exhaust port G17B. The third pneumatic section is coupled to the first pneumatic section by inserting fasteners G22, which could include dowel pins, through the third pneumatic section's rotor and bearings housing G21 and into the intake housing port G23, which aligns the primary housing G1A with G21 and G23. A separate fastener, which may include bolt pattern or similar fasteners, secures the primary housing G1A to the housing G21 near the exhaust ports G25.

In the assembly of FIG. 1, the passage of bypass air from ambient conditions into the inlets of the first and third pneumatic sections causes the rotation of the turbines therein which allows the functioning of the rotors and armature coils to produce AC or DC electric current.

Figure 2:
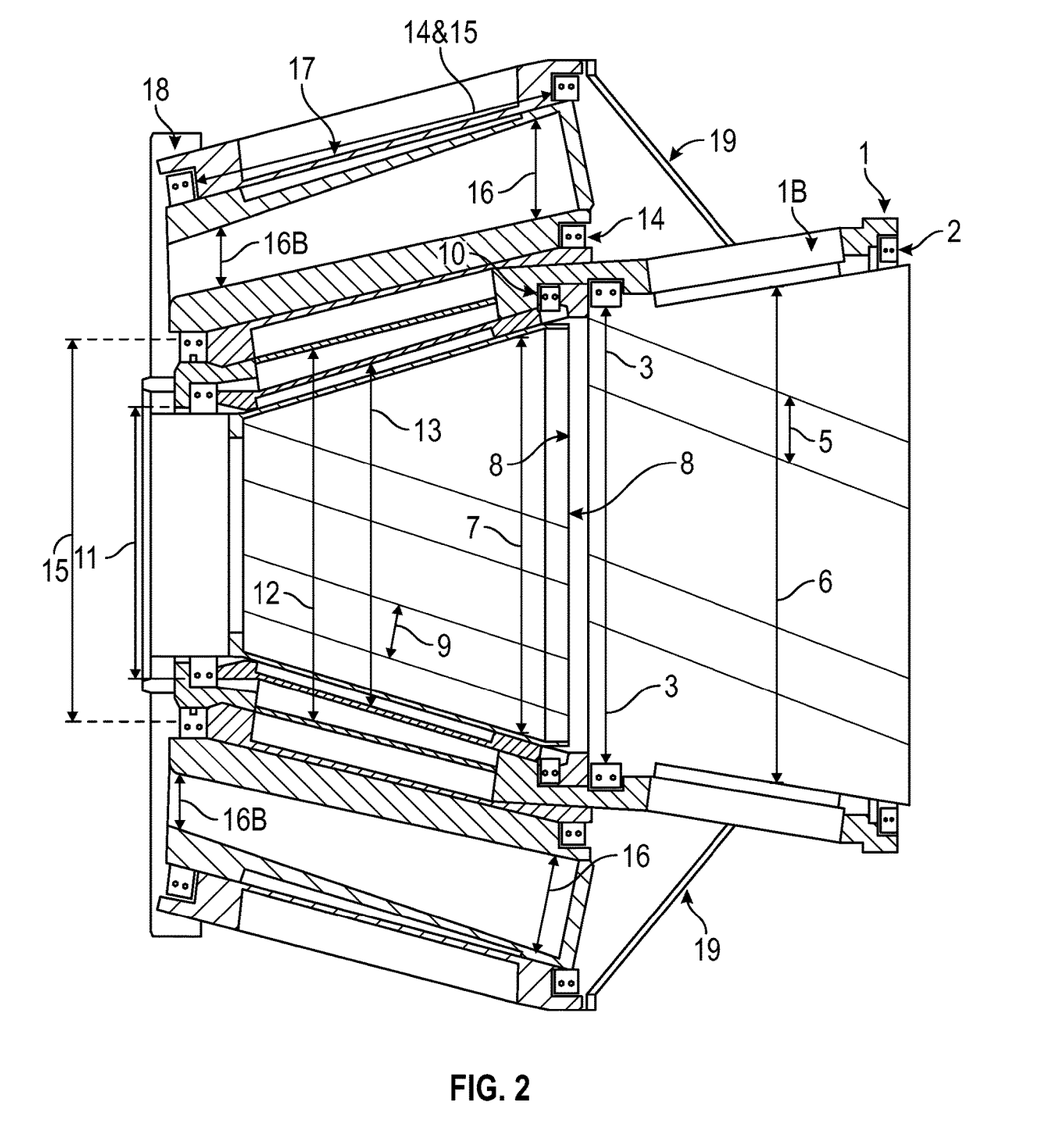
FIG. 2 is a section view of a secondary embodiment of the AC/DC Eco Electric Turbo Assembly.

FIG. 2 shows another preferred embodiment. In the assembly of FIG. 2, a turbo propulsion system is shown that utilizes three stages, or "pneumatic sections" in the compression of bypass fluid resulting from the motion of a prime mover. The first pneumatic section has a primary housing, 1, which is a conically shaped cylindrical tube attached to a second portion of the primary housing containing an embedded unitized field coil 1B to be rigidly mounted to the primary housing 1 by intake rotor bearings 2 at the intake rotor's initial opening. At the exhaust side of the interior of the primary housing 1, the primary housing 1 is attached to the unitized armature and rotor 6 by the intake rotor's exhaust bearings 3.

In the assembly of FIG. 2, the second pneumatic section has an outer bearing and blades cage support 8, which is secured to the first pneumatic section's primary housing 1 by the output rotor's intake bearings 10. The unitized armature rotor, blade cage, blades, and bearing support 7 has blades along the interior extending from the interior surface radially inward 9. The second pneumatic section's field coil 12 and rotor armature coil 13 are attached to the rotor drum 7 of the second pneumatic section, which rotor drum 7 is journaled by bearings located in the second pneumatic section of the primary housing 1. The unitized armature rotor, blade cage, blades, and bearing support 7 is fixed at the outlet of the second pneumatic section to the primary housing 1 of the first pneumatic section by an output exhaust bearing 11.

In the assembly of FIG. 2, the third pneumatic section has an intake rotor with unitized armature 12 and an exhaust rotor with unitized armature 16B. These rotors are housed by a rear housing cover 18 and contain embedded field coil and magnets 17. The rear housing cover 18 is attached to the intake rotor 16 and exhaust rotors 16B by an intake rotor/armature bearing 14 and an exhaust rotor and armature bearing 15, respectively. The primary housing 1 is attached to the third section housing's rear housing cover 18 by an induction attachment to rigidity mount 19.

In the assembly of FIG. 2, the passage of bypass fluid from ambient conditions into the inlets of the first and third pneumatic sections is compressed by the rotation of the turbines therein which allows the functioning of the rotors and armature coils to utilize AC or DC electric current to further compress the bypass fluid and create force. Further, in this embodiment, no central shaft is present, which maximizes the volume of air or other bypass fluid into the turbo assembly, thereby creating higher pressure at the outlet of the second and third pneumatic sections, which maximizes the conversion of kinetic energy from the bypass fluid into usable force.

Figure 5:
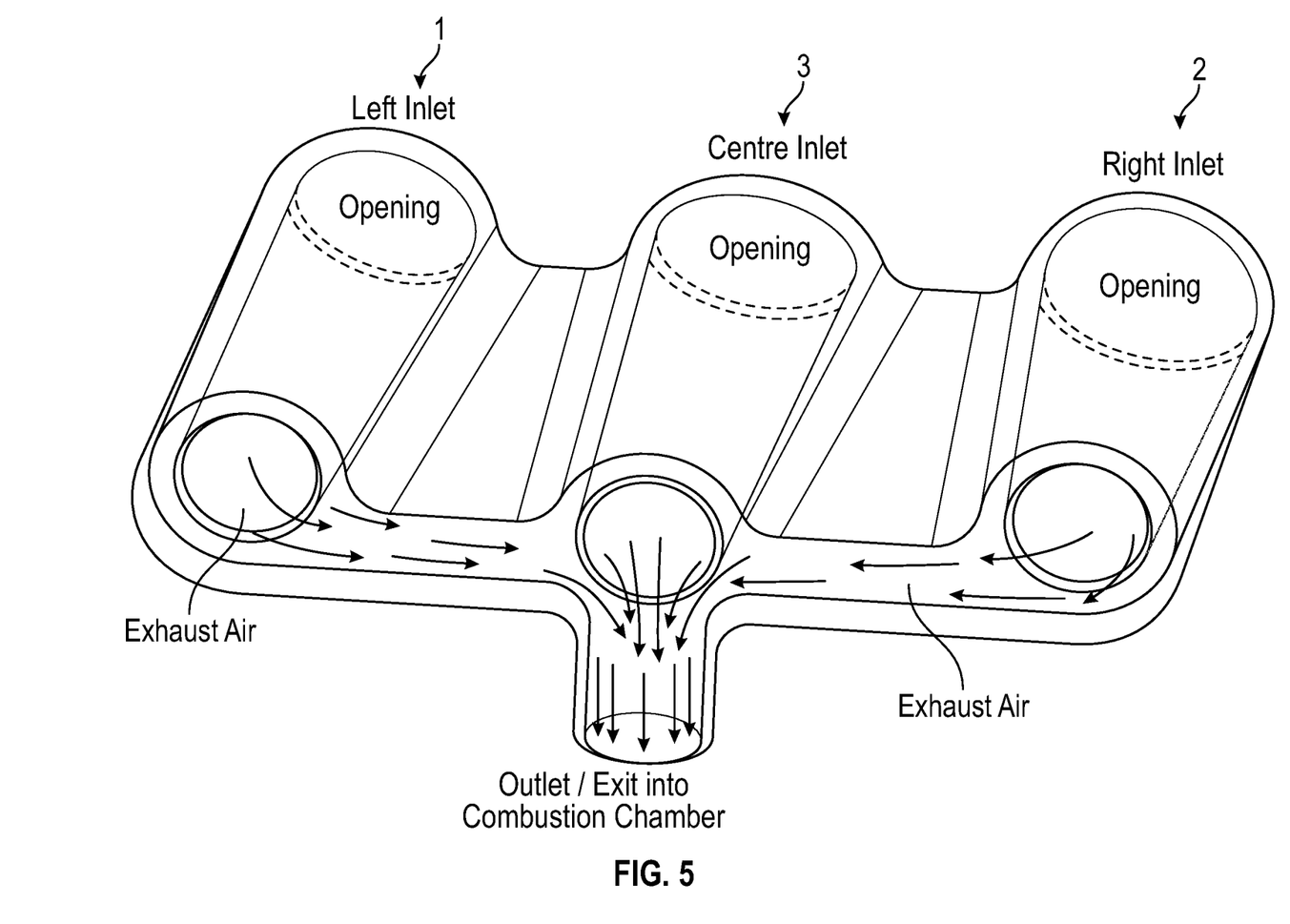
FIG. 5 is a nonlimiting example of an AC/DC Eco Electric Turbo Assembly whereby a left pneumatic section 1, a central pneumatic section 3 and a right pneumatic section 2 direct air from an area of lower pressure to an area of higher pressure at the outlet, whereby the fluid leaving the outlet of the AC/DC Eco Electric Turbo Assembly in FIG. 5 enters a combustion chamber upon exit from the AC/DC Eco Electric Turbo Assembly.
Figure 7:
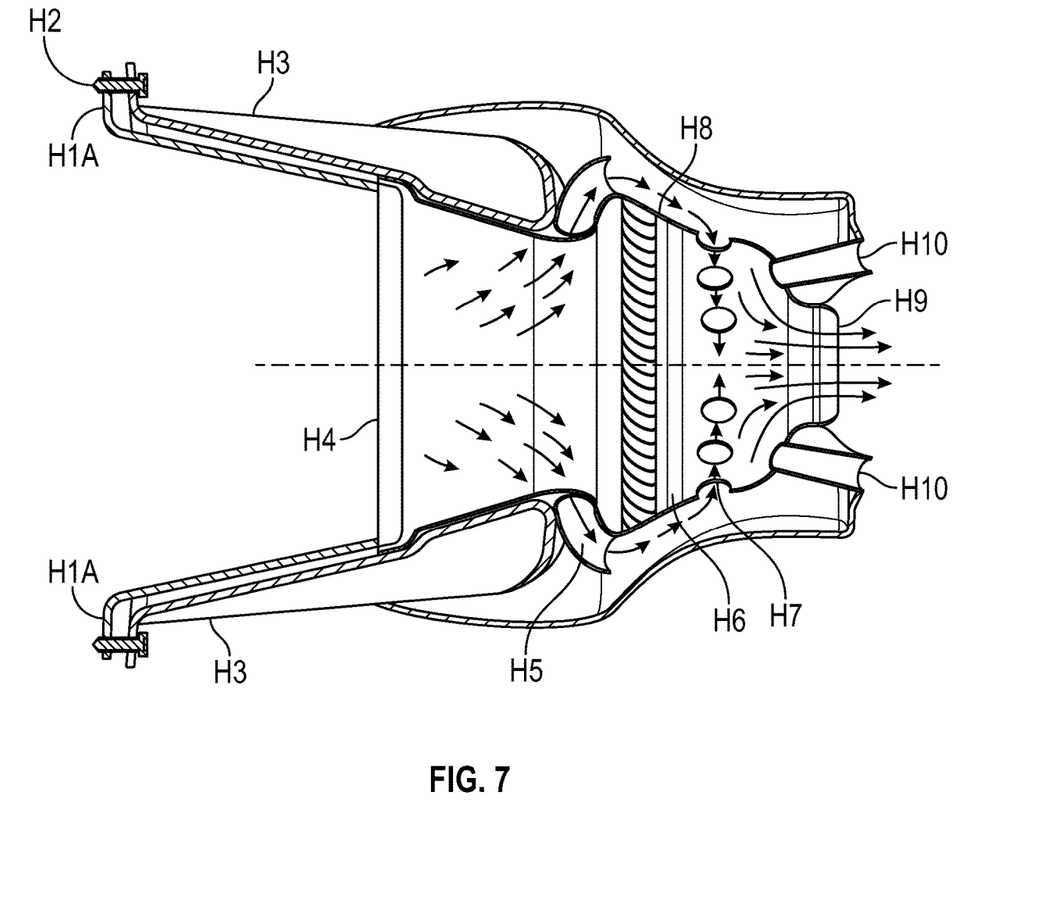
FIG. 7 is a cross section of a conversion chamber that is fastened to the outlet of the primary housing of the AC/DC Eco Electric Turbo Assembly, which primary housing is shown in non-limiting embodiments in FIGS. 1 and 2.

Further, in another preferred embodiment, the AC/DC Eco Electric Turbine Assembly, including but not limited to the assemblies shown in FIG. 1 or 2 or 5, may be coupled with one or more conversion chambers, such as that shown in FIG. 7, whereby the exhausted bypass fluid exiting the AC/DC Eco Electric Turbine Assembly enters the conversion chamber which further transfers the kinetic energy from the exhausted bypass fluid to thrust, electrical energy, or potential energy depending on the type of conversion chamber used.

Figure 3:
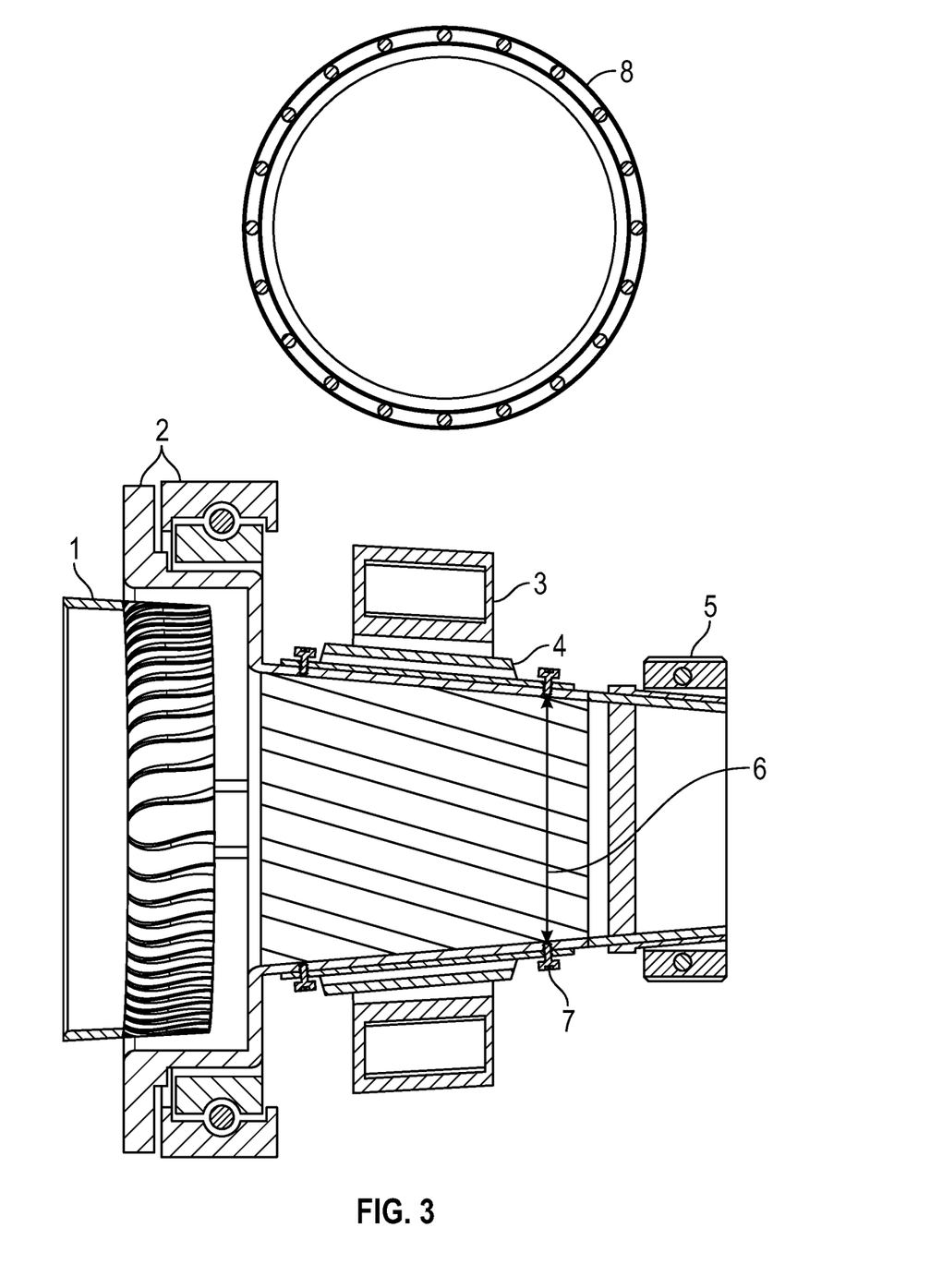
FIG. 3 shows a frontal view 8 of the cylindrical opening to the turbine blade rotor drum and a cross sectional view 1-7 of the turbine blade rotor drum, which cross sectional view is also shown in FIG. 6.

FIG. 3 shows the cross section 1-7 and frontal view 8 of an exemplary turbine rotor drum for use in the claimed invention. Therein, a unitized first inlet fan and rotor or stator 1 is attached to the rotor 4 by an inlet housing bearing 2. A field coil or stator 3 is attached to the rotor 4. Fasteners 7 attach the input turbine blades 6 to the rotor. The output rotor bearing 5 can be used to mount the assembly. As shown by frontal view 8, the inlet bearings 2 can vary by application.

Figure 6:
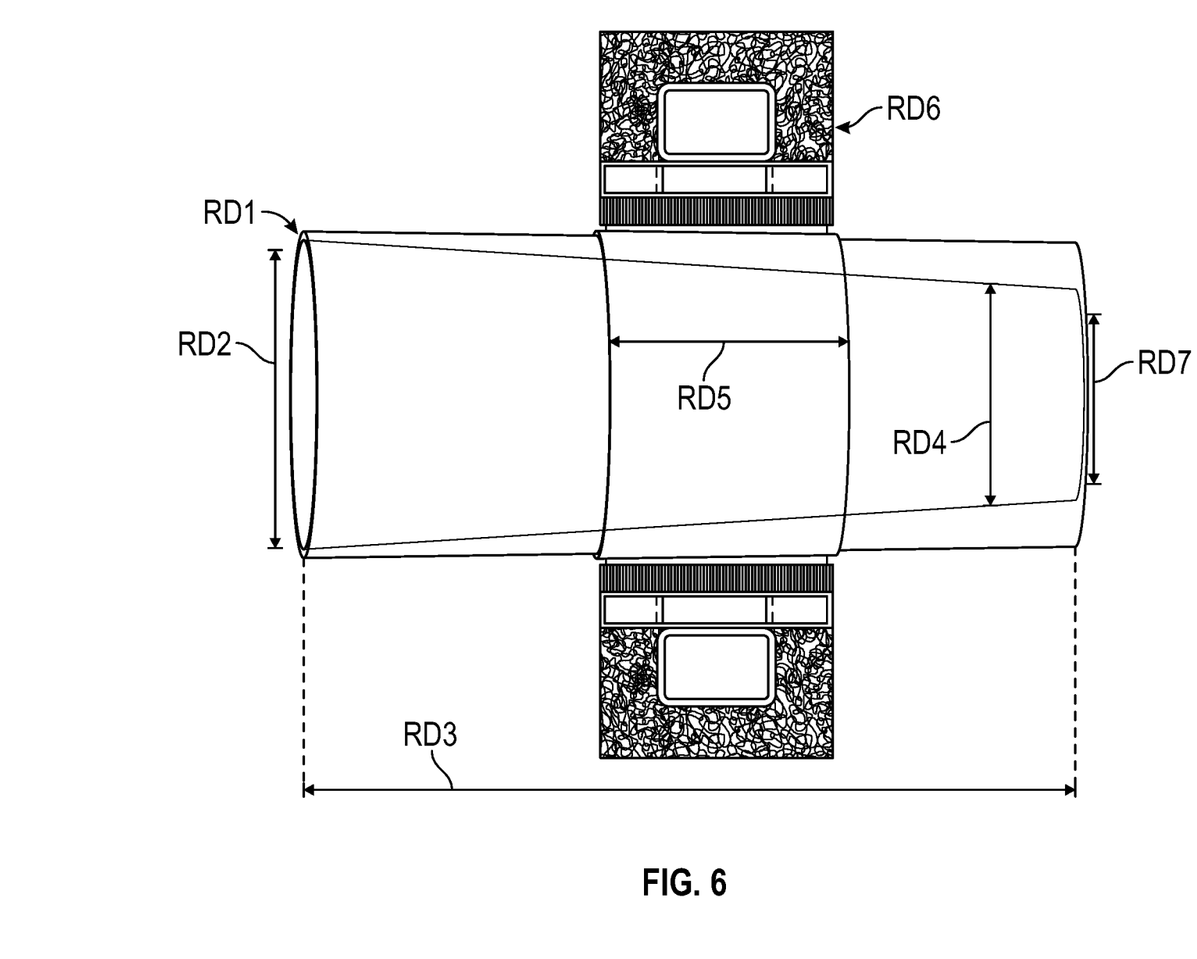
FIG. 6 is a cross section view of an exemplary rotor drum and a prime mover.

FIG. 6 shows an exemplary but nonlimiting turbine rotor drum RD1 for use in the third pneumatic section's claimed turbo assembly. The rotor drum inlet RD2 allows bypass air or other bypass fluid to enter the third pneumatic section directly and not necessarily only from the exhaust of the first pneumatic section. The bypass fluid then travels the length of the rotor drum RD3, which length can be selected based on the particular application to which the claimed device is applied. The exemplary rotor drum of FIG. 6 contains a locking cage for securing turbine blades that will spin due to the application of kinetic energy from the rotor coil RD5 and field coil RD6, before exiting via the outlet RD7 at a particularly high velocity and pressure.

Figure 4:
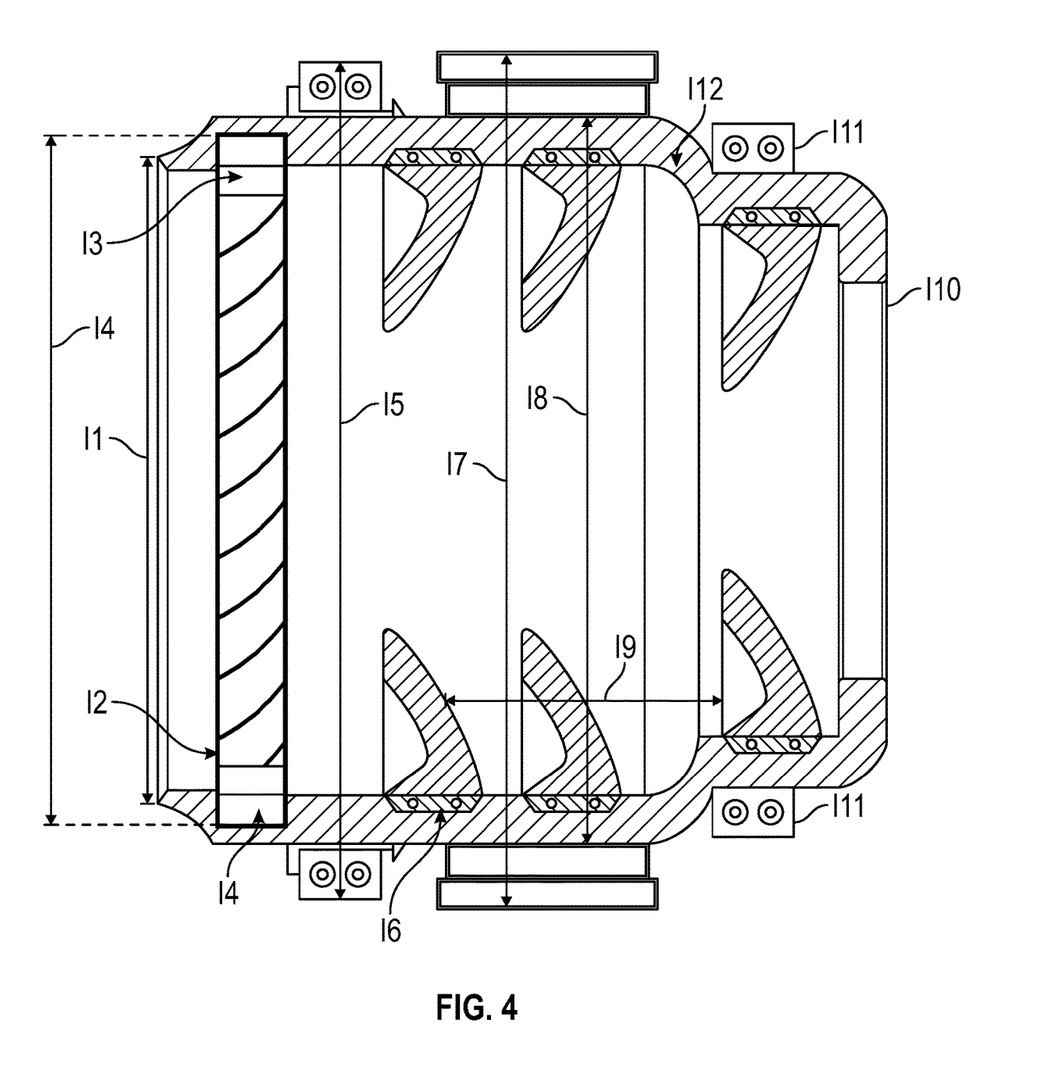
FIG. 4 shows an exemplary nonlimiting internal dovetail design for turbine blades.

FIG. 4 shows an exemplary but not limiting "dovetail" design for internal turbine blades that can be applied to the claimed invention. The inlet I1 allows bypass air or fluid to enter the rotor where it will first encounter an inlet fan I2, having exterior vertical blades. The application of kinetic energy from a rotor coil I3 and field coil I4 to the inlet fan I2 allows the fan to spin. Once the bypass fluid passes the inlet fan I2, rotor coil I3 and field coil I4, it can interact with the interior turbine blades I9, which blades spin via the application of kinetic energy from the rotor frame's field coil I7 and the rotor coil/armature I8. The rotor has a rotor frame I12, to which the turbine blades I9 can be secured by dovetail locks I6. The bypass fluid interacting with the turbine blades I9 allows the compression of the bypass fluid such that it exits at the exhaust port at a high pressure. The rotor frame can be affixed to a housing by a forward inlet bearing I5 and an inner frame/drum bearing I11.

FIG. 5 shows an exemplary but nonlimiting embodiment of the AC/DC Eco Electric Turbo Assembly. In the assembly of FIG. 5, bypass fluid enters the assembly into a left pneumatic section 1, center pneumatic section 3, and right pneumatic section 2. Each pneumatic section is a turbine unit including a conically shaped duct that decreases in diameter from the opening to the outlet. The bypass fluid interacts with the turbine unit, which is powered by one or more field coil(s) and/or rotor coil(s)/armature(s), and the result is the compression of the bypass fluid. Further, the decrease in diameter of the ducts increases the pressure of the bypass fluid and causes it to speed up at the exit of the assembly thereby increasing the recovered kinetic energy from the bypass fluid. In the embodiment shown, the exhaust port is attached to a combustion chamber such that the exhausted bypass fluid enters the combustion chamber at a high pressure.

FIG. 7 shows an exemplary but nonlimiting conversion chamber that may be attached to the exhaust port(s) of the second and third pneumatic sections of any embodiment of the claimed invention. The conversion chamber of FIG. 7 shows a combustion chamber assembly's housing H3 secured by fasteners H2 to the outlet of the second and third pneumatic sections of the claimed invention via the primary housing of the claimed invention H1A. An exhaust parting seal H4 seals the connection between the combustion chamber's housing H3 and the primary housing of the claimed invention H1A. Exhaust bypass air from the exhaust ports of the second and third pneumatic sections of the claimed invention enter the combustion chamber and travel through compressed air ports H5, through an air/gas regulator H6, and into the combustion chamber's inlet ports H7. Oxygen ports H8 allow the entry of oxygen into the system to aid combustion. The waste from the combustion conversion process is exhausted through a center exhaust port H9 and three equally spaced exhaust ports H10.

Figure 8:
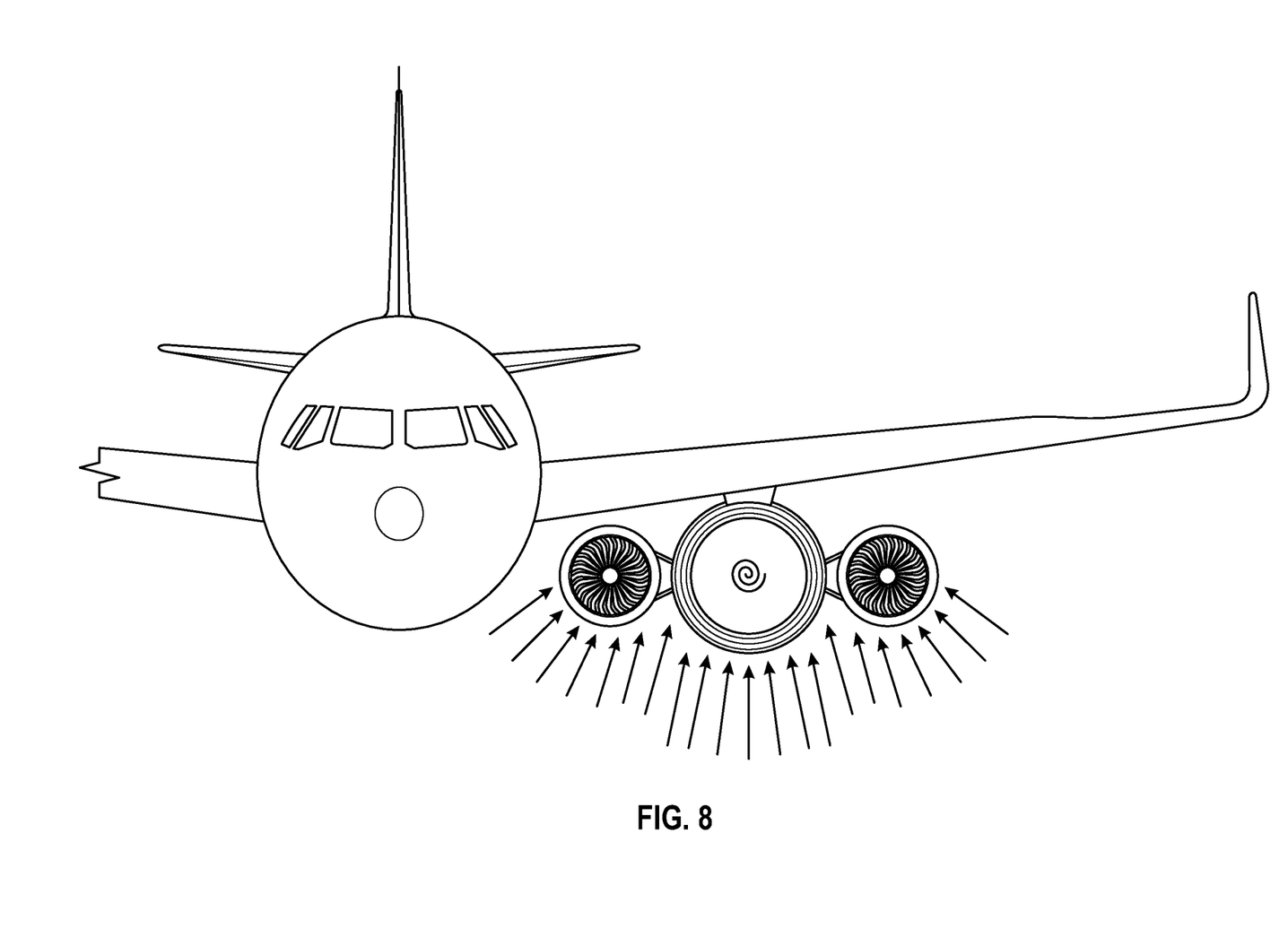
FIG. 8 shows a non-limiting example application whereby the claimed device is attached laterally proximate to either side of a traditional jet engine along the wing of an aircraft, thereby capturing some of the kinetic energy from bypass air resulting from the aircraft's primary motion.

FIG. 8 shows an exemplary, nonlimiting application of the claimed invention, whereby the AC/DC Eco Electric Turbo Assembly is mounted to the wing of a plane, laterally proximate to a jet engine, such that bypass air resulting from the motion of the plane's prime mover caused by the jet engine enters the AC/DC Eco Electric Turbo Assembly and part of the kinetic energy therefrom is transformed into thrust or electric or potential energy, depending on the specific embodiment of the invention, thereby increasing the propulsive efficiency of the jet engine.

The invention claimed is:

1. An electric turbine assembly, comprising: (a) A first pneumatic section that includes a primary conical shaped cylindrical tube that houses an intake rotor drum with turbine fan blades arranged radially along a central axis and a field coil/armature configuration, whereby bypass fluid enters the first pneumatic section from ambient conditions and the exhaust bypass fluid from the first pneumatic section is fed into a second pneumatic section; (b) A second pneumatic section fixed to the outlet of the first pneumatic section, which second pneumatic section includes a second rotor drum apparatus with turbine fan blades arranged radially along the central axis and a field coil/armature configuration, whereby the exhaust bypass fluid from the exhaust port of the first pneumatic section passes through the second pneumatic section, and is compressed via the rotation of the turbine blades before exiting the exhaust port of the second pneumatic section; and (c) A third pneumatic section, which third pneumatic section includes one or more rotor drum apparatuses, said rotor drum apparatuses containing a field coil/armature configuration and turbine fan blades arranged radially along the central axis of the rotor drum, and the rotor drum apparatuses are fixed proximally to the housing of the first pneumatic section whereby bypass fluid can enter the third pneumatic section from the ambient conditions and/or the exhaust from the first pneumatic section, such that bypass fluid passes through the third pneumatic section and is compressed via the rotating turbine blades.

2. The device of claim 1, wherein the turbine blades are attached radially to an intermediate shaft along the central axis extending from the central axis towards the wall of the rotor drum of the first and/or second pneumatic section.

3. The device of claim 1, wherein the turbine blades are attached radially to the interior of the rotor drum and extend towards the central axis, and there is no intermediate shaft along the axis, allowing for a maximized volume of fluid influx into the apparatus and minimization of drag.

4. The device of claim 1, wherein a pre-treatment device to control temperature is attached to the inlet of the drum such that air flow speed into the inlet of the device is maximized and pressure at the inlet of the device is increased.

5. The device of claim 1, wherein a conversion chamber is fixed to the outlet of the second and third pneumatic sections such that the exhausted bypass fluid enters the conversion chamber and is transformed into thrust or potential energy depending on the specifications of the conversion chamber.

6. The device of claim 1, wherein a variable number and combination of field coils, stators, and rotors/armatures are incorporated to any rotor drum assembly to improve the versatility of the pneumatic sections.

7. The device of claim 6, wherein the field coils, stators, and rotors/armatures are controlled by a variable speed electrical motor controller and open loop and/or tap winding and variable frequency drives.

8. An electric turbine assembly, comprising: (a) A central pneumatic section that includes a conical shaped cylindrical tube that houses one or more rotor drums with a field coil/armature configuration and turbine fan blades arranged radially along the axis of the rotor drum, whereby bypass fluid enters the central pneumatic section from ambient conditions and is compressed by the rotation of the turbine blades, then the exhaust bypass fluid from the central pneumatic section joins the exhaust fluid from the distal pneumatic sections to exit a common exhaust port; (b) Two or more identical distal pneumatic sections that are fixed distally and symmetrically to the central pneumatic section, which distal pneumatic sections each include at least one rotor drum with a field coil/armature configuration and turbine fan blades arranged radially along the axis of the rotor drum, whereby the bypass fluid from ambient conditions passes through the distal pneumatic sections and is compressed via the rotation of the turbine fan blades, then the exhaust bypass fluid from the distal pneumatic sections joins the exhaust fluid from the central pneumatic section to exit a common exhaust port.

9. The device of claim 8, wherein the turbine blades are attached radially to an intermediate shaft along the central axis extending from the central axis towards the wall of the rotor drum of the first and/or second pneumatic section.

10. The device of claim 8, wherein the turbine blades are attached radially to the interior of the rotor drum and extend towards the central axis, and there is no intermediate shaft along the axis, allowing for a maximized volume of fluid influx into the apparatus and minimization of drag.

11. The device of claim 8, wherein a pre-treatment device to control temperature is attached to the inlet of the drum such that air flow speed into the inlet of the device is maximized and pressure at the inlet of the device is increased.

12. The device of claim 8, wherein a conversion chamber is fixed to the outlet of the second and third pneumatic sections such that the exhausted bypass fluid enters the conversion chamber and is transformed into thrust or potential energy depending on the specifications of the conversion chamber.

13. The device of claim 8, wherein a variable number and combination of field coils, stators, and rotors/armatures are incorporated to any rotor drum assembly to improve the versatility of the pneumatic sections.

14. The device of claim 13, wherein the field coils, stators, and rotors/armatures are controlled by a variable speed electrical motor controller and open loop and/or tap winding and variable frequency drives.

\* \* \* \* \*